(12) United States Patent
Bennett

(10) Patent No.: US 6,973,594 B2
(45) Date of Patent: Dec. 6, 2005

(54) METHOD AND APPARATUS FOR DISABLING A COMPUTER SYSTEM BUS UPON DETECTION OF A POWER FAULT

(75) Inventor: Joseph A. Bennett, Roseville, CA (US)

(73) Assignee: Intel Corporation, Santa Clara, CA (US)

( * ) Notice: Subject to any disclaimer, the term of this patent is extended or adjusted under 35 U.S.C. 154(b) by 343 days.

(21) Appl. No.: 09/753,006

(22) Filed: Dec. 29, 2000

(65) Prior Publication Data

US 2002/0087919 A1   Jul. 4, 2002

(51) Int. Cl.[7] ............................................. G06F 11/00
(52) U.S. Cl. ...................................... 714/43; 714/56
(58) Field of Search .............................. 714/43–44, 56, 714/14; 710/108, 117, 200, 260, 262

(56) References Cited

U.S. PATENT DOCUMENTS

| | | | |
|---|---|---|---|
| 4,607,309 A * | 8/1986 | Bishop | 361/62 |
| 4,639,817 A * | 1/1987 | Cooper et al. | 361/62 |
| 4,931,742 A * | 6/1990 | Karash et al. | 324/541 |
| 5,367,697 A * | 11/1994 | Barlow et al. | 713/330 |
| 5,875,308 A * | 2/1999 | Egan et al. | 710/302 |
| 6,202,115 B1 * | 3/2001 | Khosrowpour | 710/312 |
| 6,449,729 B1 * | 9/2002 | Sanders et al. | 714/4 |
| 6,457,082 B1 * | 9/2002 | Zhang et al. | 710/260 |
| 6,532,546 B2 * | 3/2003 | Sanders et al. | 714/4 |

* cited by examiner

Primary Examiner—Dieu-Minh Le
(74) Attorney, Agent, or Firm—Blakely, Sokoloff, Taylor & Zafman LLP

(57) ABSTRACT

One embodiment of a system for disabling a computer bus upon detection of a power fault includes a bus bridge device coupled to a bus and a power regulator that delivers power to the bus. If the power regulator detects a power fault, then the power regulator asserts a fault signal to the bus bridge device. The power regulator also removes power from the bus. The bus bridge device disconnects an internal logic unit from the bus in response to the assertion of the fault signal. The bus bridge device, in further response to the assertion of the fault signal, alerts the system of the power fault by asserting an interrupt signal.

18 Claims, 2 Drawing Sheets

METHOD AND APPARATUS FOR DISABLING A COMPUTER SYSTEM BUS UPON DETECTION OF A POWER FAULT

FIELD OF THE INVENTION

The present invention pertains to the field of computer systems. More particularly, this invention pertains to the field of disabling a computer system bus upon detection of a power fault.

BACKGROUND OF THE INVENTION

Computer system components may communicate one with another by way of a computer system bus. A computer system may include several busses. A device that couples one bus to another is typically referred to as a bus bridge. Computer system busses include multiple signal lines, including lines that deliver power to various system components. If a bus experiences a power fault of some kind, such as a short between a power line and some other line, that bus will malfunction. A power fault of this type would likely result in system component malfunction. A bus bridge device coupled to the malfunctioning bus may also malfunction, in that it may be exposed to invalid data that would be passed on to other system components, such as a processor. The end result would be an entire system failure.

Some current computer systems implement what is often referred to as "hot plug" slots, where system components mounted on cards may be inserted into slots that are fixed to a main computer system board. The slots are electrically coupled to a bridge device via a bus. The term "hot plug" is meant to indicate that a card may be inserted or removed without powering down the system. Some hot plug systems implement power fault protection schemes whereby if a power fault is detected at one of the slots, power is removed from that slot. Hot plug power fault implementations have the disadvantage of being relatively expensive to implement due to the extra motherboard and bridge device hardware as well as the software stack that is required to manage a hot plug environment.

SUMMARY OF DISCLOSURE

According to one embodiment, a system for disabling a computer bus upon detection of a power fault includes a bus bridge device coupled to a bus and a power regulator that delivers power to the bus. If the power regulator detects a power fault, then the power regulator asserts a fault signal to the bus bridge device. The power regulator also removes power from the bus. The bus bridge device disconnects an internal logic unit from the bus in response to the assertion of the fault signal. The bus bridge device, in further response to the assertion of the fault signal, alerts the system of the power fault by asserting an interrupt signal. In a particular embodiment, the bus is a secondary PCI bus and the bus bridge device is a PCI/PCI bridge bridging the secondary PCI bus to a primary PCI bus coupled to a processor via a system logic device. In response to the fault signal, the PCI/PCI bridge is configured to assert an error signal to the system logic device regarding a fault condition associated with the fault signal.

BRIEF DESCRIPTION OF THE DRAWINGS

The invention will be understood more fully from the detailed description given below and from the accompanying drawings of embodiments of the invention which, however, should not be taken to limit the invention to the specific embodiments described, but are for explanation and understanding only.

DETAILED DESCRIPTION

One embodiment of a system for disabling a computer bus upon detection of a power fault includes a bus bridge device coupled to a bus and a power regulator that delivers power to the bus. If the power regulator detects a power fault, then the power regulator asserts a fault signal to the bus bridge device. The power regulator also removes power from the bus. The bus bridge device disconnects an internal logic unit from the bus in response to the assertion of the fault signal. The bus bridge device, in further response to the assertion of the fault signal, alerts the system of the power fault by asserting an interrupt signal.

Figure 1:
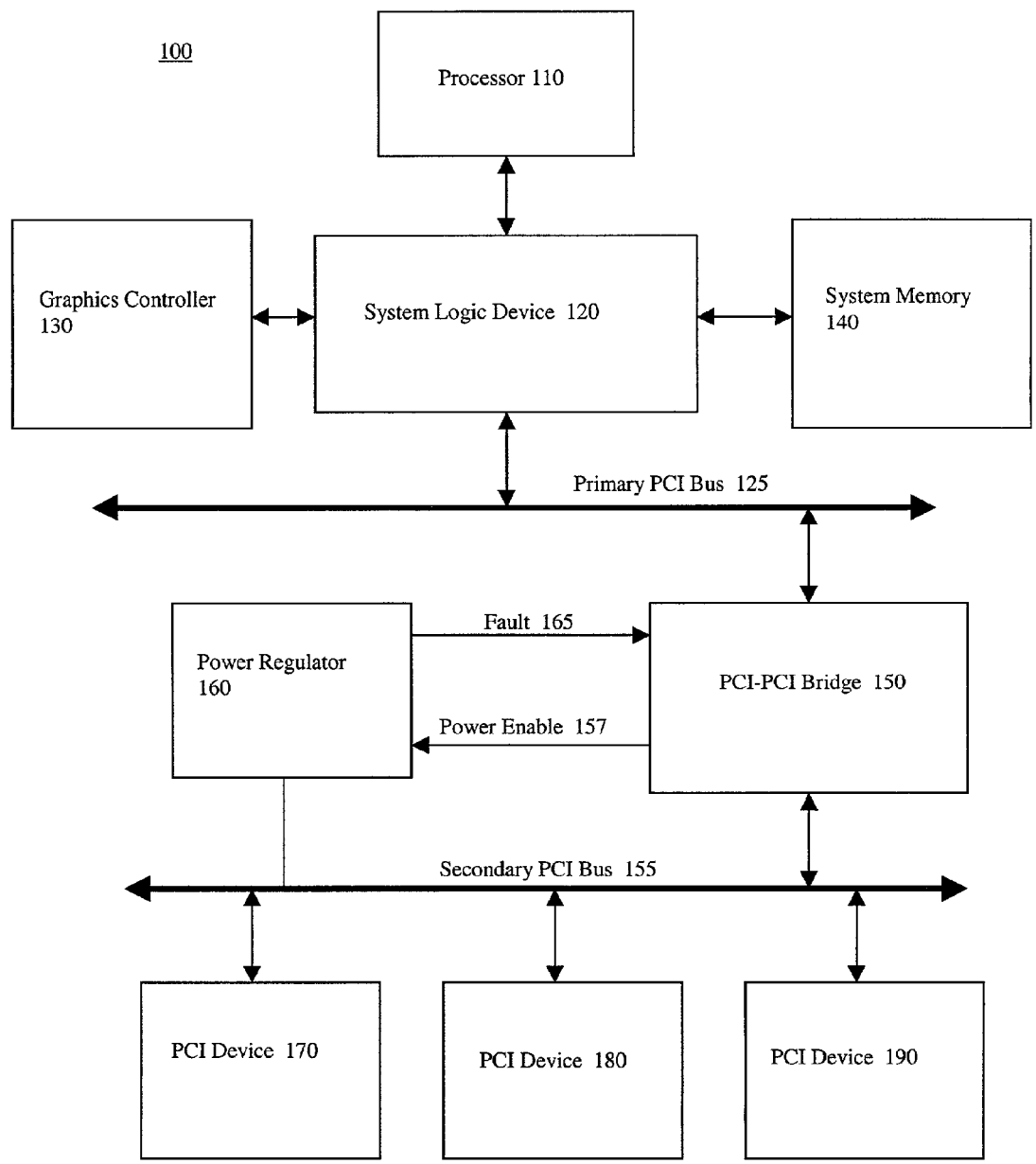
FIG. 1 is a block diagram of a system including a bus bridge device and a power regulator implemented in accordance with one embodiment of the invention.

FIG. 1 is a block diagram of a system 100. The system 100 includes a processor 110 coupled to a system logic device 120. The system logic device 120 is also coupled to a graphics controller 130 and a system memory 140. The system logic device 120 is further coupled to a primary peripheral component interconnect (PCI) bus 125. The system logic device 120 allows the processor 110 to communicate with the system memory 140, the graphics controller 130, and the primary PCI bus 125. Similarly, the system logic device 120 allows PCI bus agents to access the system memory 140. The graphics controller 130 may also access the system memory 140 through the system logic device 120. The system logic device 120 may also receive error signals and interrupts from the primary PCI bus 125 and may in turn signal interrupts to the processor 110. The processor 110, the system logic device 120, the graphics controller 130, and the system memory 140 are meant to represent a broad range of processors, system logic devices, and system memory implementations. Embodiments are also possible with system configurations other than that shown in FIG. 1, including systems with more than one processor.

The primary PCI bus 125 is further coupled to a PCI-PCI bridge 150. The PCI-PCI bridge 150 couples the primary PCI bus 125 to a secondary PCI bus 155. The secondary PCI bus 155 has coupled to it several PCI devices 170, 180, and 190. These devices may include disk drive controllers or other input/output devices. Other embodiments are possible using other PCI components.

A power regulator 160 delivers power to the secondary PCI bus 155. When the system 100 is first started, the PCI-PCI bridge 150 asserts a power enable signal 157 to the power regulator 160. The power regulator 160 then applies power to the secondary PCI bus 155. If the power regulator 160 detects a short or other power fault condition, the power regulator 160 removes power from the secondary PCI bus 155 and asserts a fault signal 165. The power regulator 160 may detect a fault by detecting an undervoltage condition or an overcurrent condition. The term "power regulator" as used herein is meant to include any device capable of delivering power to a bus or other type of system component interconnect.

The fault signal 165 is received by the PCI-PCI bridge 150. In response to the assertion of the fault signal 165, the PCI-PCI bridge 150 disconnects its internal logic from the secondary PCI bus 155 so that the internal logic of the PCI-PCI bridge 150 will not become corrupted with invalid data from the secondary PCI bus 155. The PCI-PCI bridge 150 also signals an interrupt to the system logic device 120 over the primary PCI bus 125. Other embodiments may include the PCI-PCI bridge 150 asserting an error signal that is delivered to the system logic device 120. Still other embodiments are possible using any other technique for signaling an error or fault condition, including write transactions to memory that are directed to or visible to one or more processors.

Once the processor 110 is notified of the pending interrupt or error condition, system software can then take steps to schedule a system shutdown or take other steps such as alerting a system administrator of the fault condition.

The PCI-PCI bridge 150 may also deassert the power enable signal 157. The power regulator 160 will not again deliver power to the secondary PCI bus 155 unless the PCI-PCI bridge 150 asserts the power enable signal 157.

In response to the deassertion of the power enable signal 157, the power regulator 160 deasserts the fault signal 165.

Although the busses discussed above in connection with FIG. 1 are PCI busses, other embodiments are possible using other types of busses or system component interconnects. Also, although the system 100 and the corresponding discussion above describe a PCI-PCI bridge device with the ability to receive and react to the fault signal, other embodiments are possible where the fault signal recognition, the power enable signal assertion, or the disconnecting of internal logic capabilities are located in other computer system component types.

Figure 2:
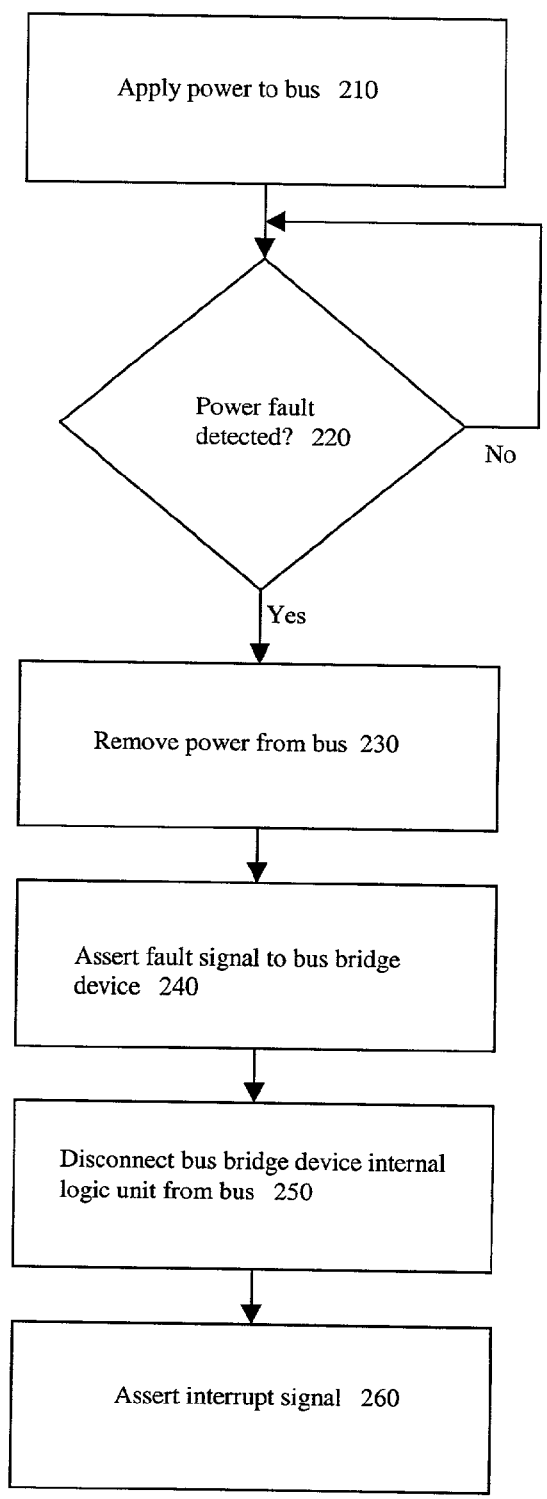
FIG. 2 is a flow diagram of one embodiment of a method for disabling a computer bus upon detection of a power fault.

FIG. 2 is a flow diagram of one embodiment of a method for disabling a computer system bus upon an occurrence of a fault condition. At block 210, power is applied to a bus. If a power fault is detected at block 220, the power is removed from the bus at block 230. At block 240, a fault signal is asserted to a bus bridge device. Other embodiments are possible using other types of system components.

In response to the assertion of the fault signal, at block 250 the bus bridge device disconnects an internal logic unit from the bus. Lastly, at block 260 an interrupt is asserted to alert the system of the fault condition. Other embodiments are possible using other techniques for signaling error conditions or faults.

In the foregoing specification the invention has been described with reference to specific exemplary embodiments thereof. It will, however, be evident that various modifications and changes may be made thereto without departing from the broader spirit and scope of the invention as set forth in the appended claims. The specification and drawings are, accordingly, to be regarded in an illustrative rather than in a restrictive sense.

Reference in the specification to "an embodiment," "one embodiment," "some embodiments," or "other embodiments" means that a particular feature, structure, or characteristic described in connection with the embodiments is included in at least some embodiments, but not necessarily all embodiments, of the invention. The various appearances of "an embodiment," "one embodiment," or "some embodiments" are not necessarily all referring to the same embodiments.

What is claimed is:

1. A system, comprising:
   a bus including a power line;
   a bus bridge device including an internal logic unit; and
   a power regulator to deliver power to the power line, the power regulator further to assert a fault signal to the bus bridge device if a power fault is detected on the bus, the bus bridge device to disconnect the internal logic unit from the bus in response to an assertion of the fault signal to prevent the internal logic unit from being corrupted with invalid data from the bus,
   wherein the bus is a secondary PCI bus, wherein the bus bridge device is a PCI/PCI bridge bridging the secondary PCI bus to a primary PCI bus coupled to a processor via a system logic device, and wherein in response to the fault signal,
      the PCI/PCI bridge is configured to assert an error signal to the system logic device regarding a fault condition associated with the fault signal,
      the system logic device is configured to generate an interrupt to the processor, and
      in response to the interrupt, the processor is configured to invoke system software to perform a predetermined operation, including at least one of scheduling a system shutdown and alerting a system administrator regarding the fault condition.

2. The system of claim 1, the power regulator to cease to deliver power to the power line if a power fault is detected.

3. The system of claim 2, the bus bridge device to assert an interrupt signal in response to the assertion of the fault signal.

4. The system of claim 2, the bus bridge device to assert an error signal in response to the assertion of the fault signal.

5. The system of claim 2, the bus bridge device to assert a power enable signal to the power regulator upon system startup, the power regulator to deliver power to the power line in response to the assertion of the power enable signal.

6. The system of claim 5, the bus bridge device to deassert the power enable signal follow the assertion of the fault signal.

7. The system of claim 6, the power regulator module to deassert the fault signal in response to the deassertion of the power enable signal.

8. The system of claim 7, wherein the bus is a PCI bus.

9. The system of claim 1, wherein the bus bridge device is to assert a power enable signal to the power regulator to enable the power regulator to deliver power to the bus when the power fault is not detected.

10. The system of claim 9, wherein in response to the detected power fault, the bus bridge device is to de-assert the power enable signal to the power regulator to enable the power regulator stop delivering the power to the bus.

11. The system of claim 10, wherein in response to the de-asserted power enable signal received from the bus bridge device, the power regulator is to de-assert the fault signal to the bus bridge device.

12. The system of claim 11, wherein the power regulator is not to deliver the power to the bus again until the power enable signal is asserted by the bus bridge device.

13. A bus bridge device, comprising:
   a bus interface unit coupling the bus bridge device to a bus;
   an internal logic unit coupled to the bus interface unit; and
   a fault signal input coupled to receive a fault signal, the bus bridge device to disconnect the internal logic unit from the bus in response to an assertion of the fault signal to prevent the internal logic unit from being corrupted with invalid data from the bus,
   wherein the bus is a secondary PCI bus, wherein the bus bridge device is a PCI/PCI bridge bridging the secondary PCI bus to a primary PCI bus coupled to a processor via a system logic device, and wherein in response to the fault signal, the PCI/PCI bridge is configured to assert an error signal to the system logic device regarding a fault condition associated with the fault signal, the system logic device is configured to generate an interrupt to the processor, and in response to the interrupt, the processor is configured to invoke system software to perform a predetermined operation, including at least one of scheduling a system shutdown and alerting a system administrator regarding the fault condition.

14. The bus bridge device of claim 13, further comprising an interrupt signal output, the bus bridge device to assert the interrupt signal output in response to the assertion of the fault signal.

15. The bus bridge device of claim 13, further comprising an error signal output, the bus bridge device to assert the error signal in response to the assertion of the fault signal.

16. A computer implemented method for disabling a computer bus upon detection of a power fault, the method comprising:

applying power to a bus;

detecting a power fault on the bus;

removing power from the bus; and asserting a fault signal to a bus bridge device; and disconnecting an internal logic unit within the bus bridge device from the bus in response to the assertion of the fault signal to prevent the internal logic unit from being corrupted with invalid data from the bus, wherein the bus is a secondary PCI bus, wherein the bus bridge device is a PCI/PCI bridge bridging the secondary PCI bus to a primary PCI bus coupled to a processor via a system logic device, and wherein in response to the fault signal, the PCI/PCI bridge is configured to assert an error signal to the system logic device regarding a fault condition associated with the fault signal, the system logic device is configured to generate an interrupt to the processor, and in response to the interrupt, the processor is configured to invoke system software to perform a predetermined operation, including at least one of scheduling a system shutdown and alerting a system administrator regarding the fault condition.

17. The method of claim 16, further comprising asserting an interrupt signal in response to the assertion of the fault signal.

18. The method of claim 16, further comprising asserting an error signal in response to the assertion of the fault signal.

* * * * *